US009070285B1

(12) United States Patent
Ramu et al.

(10) Patent No.: US 9,070,285 B1
(45) Date of Patent: Jun. 30, 2015

(54) PASSIVE CAMERA BASED CLOUD DETECTION AND AVOIDANCE FOR AIRCRAFT SYSTEMS

(75) Inventors: Prakash Ramu, Los Angeles, CA (US); Hieu Nguyen, Cypress, CA (US); Sharath Avadhanam, Los Angeles, CA (US); Jason Newton, Los Angeles, CA (US); Joseph Yadegar, Los Angeles, CA (US); Anurag Ganguli, Los Angeles, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 164 days.

(21) Appl. No.: 13/558,304

(22) Filed: Jul. 25, 2012

Related U.S. Application Data

(60) Provisional application No. 61/572,906, filed on Jul. 25, 2011.

(51) Int. Cl.
  *G08G 5/04* (2006.01)
  *G08G 5/00* (2006.01)
  *G01C 11/06* (2006.01)
  *G05D 1/00* (2006.01)
  *G01C 23/00* (2006.01)

(52) U.S. Cl.
  CPC ............ *G08G 5/0091* (2013.01); *G08G 5/0021* (2013.01); *G01C 11/06* (2013.01); *G05D 1/0044* (2013.01); *G01C 23/005* (2013.01)

(58) Field of Classification Search
  None
  See application file for complete search history.

(56) References Cited

U.S. PATENT DOCUMENTS

| | | | | |
|---|---|---|---|---|
| 6,289,277 | B1 * | 9/2001 | Feyereisen et al. | 701/528 |
| 6,744,382 | B1 * | 6/2004 | Lapis et al. | 340/971 |
| 7,006,950 | B1 * | 2/2006 | Greiffenhagen et al. | 703/2 |
| 8,606,041 | B2 * | 12/2013 | Keyes et al. | 382/284 |
| 2008/0140707 | A1 * | 6/2008 | Lang et al. | 707/103 Y |
| 2009/0088972 | A1 * | 4/2009 | Bushnell | 701/210 |
| 2012/0030154 | A1 * | 2/2012 | Nicholson et al. | 703/2 |

OTHER PUBLICATIONS

Chuai-Aree, S., Jager, W., Bock, H. G., Kromker, S., Kanbua, W., and Siripant, S., "3D Cloud and Storm Reconstruction from Satellite Image", Aug. 2008, pp. 1-20.
Yang, K., and Sukkarieh, S., "3D Smooth Path Planning for a UAV in Cluttered Natural Environments", 2008 IEEE/RSJ International Conference on Intelligent Robots and Systems, Nice, France, Sep. 22-26, 2008 pp. 794-800.
"Incremental Connected Components", Boost C++ Libraries, 2008.

(Continued)

*Primary Examiner* — John R Olszewski
*Assistant Examiner* — David Merlino
(74) *Attorney, Agent, or Firm* — Barlow, Josephs & Holmes, Ltd.

(57) ABSTRACT

A computerized aircraft system, such as an unmanned aircraft system (UAS) is provided with a cloud detection system. The UAS includes a monocular electro-optic or infra-red camera which acquires consecutively, in real time, a plurality of images within a field of view of the camera. The system identifies feature points in each of the consecutive images, and generates macro representations of cloud formations (3D representations of the clouds) based on tracking of the feature points across the plurality of images. A cloud avoidance system takes in nominal own-ship waypoints, compares those waypoints to the 3D cloud representations and outputs modified waypoints to avoid the detected clouds.

14 Claims, 6 Drawing Sheets

(56) References Cited

OTHER PUBLICATIONS

Seiz, G., Shields, J., Feister, U., Baltsavias, P. and Gruen, A., "Cloud Mapping with Ground-Based Photogrammetric Cameras", International Journal of Remote Sensing, vol. 28, No. 9, May 10, 2007, 2001-2032.

Hwangbo, M., Kuffner, J., and Kanade, T., "Efficient Two-hase 3D Motion Planning for Small Fixed-wing UAVs", Apr. 2007.

Nguyen, H., Porway, J., Ramu, P., Ganguli, A., and Yadegar, J., "EO/IR Due Regard Capability for UAS Based on Intelligent Cloud Detection and Avoidance", AIAA Infotech@Aerospace Conference and Exhibit 2010 Atlanta, GA Apr. 20-22, 2010.

Imaging and 3D Data Exploitation & Analysis Lab, "Observations & Modeling of Orographic Cumulus Dev Using Data Collected During CuPIDO 2006", i3dea.asu.edu/i3dea_projectDetail.php?recordID=6, pp. 1-3.

Bouguet, Jean-Yves, "Pyramidal Implementation of the Lucas Kanade Feature Tracker Description of the algorithm", 2000, pp. 1-9.

\* cited by examiner $A_{N+1} = A_N + I_{3x3} - n_{N+1} \odot n_{N+1}$
$B_{N+1} = B_N + (I_{3x3} - n_{N+1} \odot n_{N+1}) c_{N+1}$
$A_{N+1} X_{N+1} = B_{N+1}$

PASSIVE CAMERA BASED CLOUD DETECTION AND AVOIDANCE FOR AIRCRAFT SYSTEMS

DOMESTIC PRIORITY

This application claims the benefit of earlier filed U.S. Provisional Patent Application No. 61/572,906, filed Jul. 25, 2011, the entire contents of which are incorporated herein by reference.

GOVERNMENT LICENSE RIGHTS

This invention was made with government support under Air Force Contract No. FA8650-09-C-3936. The government has certain rights in the invention.

BACKGROUND AND SUMMARY OF THE INVENTION

The instant invention relates to a method of detecting cloud formations and to a method of detecting and avoiding cloud formations when Visual Meteorological Conditions (VMC) must be observed.

Unmanned Aircraft Systems (UAS) and Remotely Piloted Aircraft (RPA) are becoming indispensable tools for a huge number of aeronautical tasks such as data collection and wide area surveillance. Currently, however, UAS/RPA face limitations on their utilization in civil airspace because they do not have the capability to sense and avoid (SAA) other air traffic and clouds. Passive electro-optical (EO) or infra-red (IR) cameras can be used to provide the "sense" capability. The small size, weight and power characteristics of EO/IR sensors make them uniquely attractive for all sizes of UAS/RPA. An aircraft dependent on EO/IR sensors to detect other air traffic must also follow the Federal Aviation Administration's (FAA) Visual Flight Rules (VFR) rules which prohibit the operation of any aircraft under conditions when flight visibility is less, or distance to clouds, is less than that prescribed for the corresponding altitude and class of airspace.

This disclosure provides a novel approach that endows cloud detection and avoidance capabilities to UAS/RPA based on passive EO/IR sensors. Specifically, the proposed approach processes image sequences from a monocular camera mounted on a UAS/RPA and performs cloud detection, 3D reconstruction of cloud formations and avoidance of clouds per FAA mandates. In what follows, the moving platform carrying the EO/IR sensor is referred to as own-ship and a dynamically moving aircraft sharing the same airspace as the own-ship is referred to as an intruder.

International air navigation regulations require all aircraft, including UAS/RPA, to maintain radar separation from all other traffic. UAS/RPA equipped with radar can meet this requirement. Although radar is anticipated to serve as the primary sensor for Sense and Avoid (SAA) in many UAS/RPA, there are circumstances where radio frequency emission is undesirable. Furthermore, some air platforms may have payload size, weight and power constraints which may preclude the use of an appropriate radar sensor system. In such situations, UAS/RPA is required to maintain operations in Visual Meteorological Conditions (VMC), that is, it will have to stay clear of clouds so that it can see other air traffic using on-board EO/IR sensors. The EO/IR sensors may be the same ones used for SAA. Additionally, a large number of UAS/RPA are already equipped with EO/IR cameras used for ISR (Intelligence, Surveillance and Reconnaissance) and other missions which can be used to fulfill the dual purpose of cloud detection and avoidance. The main problem addressed by the proposed invention is to exploit image sequences from such passive EO/IR sensors for autonomous cloud detection and avoidance. Specifically, the above problem involves processing monocular image sequences, extracting 3D cloud information using known own-ship position, attitude, intrinsic and extrinsic camera calibration information and planning paths to successfully steer clear of clouds, thereby ensuring autonomous operations in VMC.

The inventions described in this disclosure can be categorized as belonging to two research areas, namely real-time 3D reconstruction of cloud formations from cameras and path planning for cloud avoidance.

Previous research on 3D cloud reconstruction from cameras has focused on cloud modeling using more sophisticated sensors than we have at our disposal. Some prior art has been able to create volumetric cloud estimates using a color stereo camera. However, there are 2 limitations with this approach. Firstly, the 2 cameras constituting the stereo pair are assumed to be static in 3D. Secondly, the 2 cameras have a large baseline of 640 meters between them. Both of these assumptions are not valid for UAS/RPA applications. Also, currently many UAS/RPA have access to monocular grayscale cameras only.

Other work has created realistic maps of cloud locations in the sky, but these techniques are ground-based and only generate 2D estimates of cloud locations.

Yet another body of work rendered a cloud from any perspective angle, even though the input data is 2D. This work is related to our work in that it is able to recreate realistic cloud structures however their methods rely on orthographic satellite images. The invention described in this disclosure, in general, can be adapted to handle grayscale, color, infra-red, monocular, stereo and multiple camera configurations.

In the present method of cloud avoidance, following the cloud reconstruction, one needs to check if the nominal path of the UAS/RPA is passing through the clouds. If the nominal UAS/RPA path is passing through the clouds, the path planner will compute another collision free path for the UAS/RPA. Path planning for collision avoidance of UAS/RPA is an active area of research and typically it involves two steps. Firstly, a discrete path connecting the starting point and the final goal is constructed while avoiding obstacles. For this step, methods like probabilistic roadmaps or Rapidly Exploring Random Trees (RRT) can be used. This connected path consists of discretized line segments and arcs that the UAS/RPA can execute. The second step is the trajectory smoothing step, in which the discrete connected paths from the first step are smoothed so that the UAS/RPA can execute it. For example, RRT has been previously utilized for path planning followed by a trajectory smoothing routine using cubic Bezier spiral curves.

A two-phase method for motion planning of fixed wing UAS/RPA in 3D environments has also been implemented. In this scenario, a coarse global planner first computes a kinematically feasible obstacle free path in a discretized 3D workspace which roughly satisfies the kinematic constraints of the UAS/RPA. Given a coarse global path, a fine local motion planner is used to compute a more accurate trajectory for the UAS/RPA at a higher level of detail. The local planner is iterated as the UAS/RPA traverses and refines the global path as needed up to its planning horizon. This work is related to the present disclosure in that the kinodynamic constraints of the UAS/RPA are accounted for in the path generation stage. However, in addition to accounting for the kinodynamic constraints, the present method is designed for the UAS/RPA to operate in National Air Space (NAS). We designed the algorithm so that the UAS/RPA:

1. Adheres to the cloud separation constraints imposed by FAA;
2. Incorporates the air corridor constraints; and
3. Avoids clouds in Real-Time.

The present disclosure also develops a new way to represent the obstacles, such as clouds or other static objects that make them more amenable for path planning and trajectory smoothing.

The inventions described in this document are concerned with processing image sequences from monocular cameras mounted on UAS/RPA, real-time extraction of 3D cloud formation information and planning paths in 3D to avoid such formations. The invention can also be used for processing color image sequences from stereo or multiple cameras. In this disclosure, we present a specific case involving a grayscale monocular camera.

Given below is a summary of inventions:

1. A novel monocular EO/IR camera based system design, comprising autonomous and intelligent cloud detection and avoidance algorithms, thereby enabling the UAS/RPA to remain in VMC which is a key-component of maintaining due-regard for the safety of other air traffic in the airspace. The design is scalable to number of color channels & cameras available on-board e.g. using stereo color instead of monocular EO/IR camera.

2. A novel incremental method (optimal in least squares sense) for extracting 3D cloud information from monocular image sequences. A sparse set of feature points are detected and tracked in the image sequence. An incremental approach processes each 2D feature track and estimates corresponding 3D positions. It is shown that as more 2D measurements are available, 3D estimates can be incrementally updated in constant time, independent of 2D track length. Each 2D track is treated independently of others in the 3D reconstruction process. If available, additional 2D measurements from EO/IR stereo or more cameras can be easily incorporated to improve 3D reconstruction. This method is easily scalable to number of cameras available on-board.

3. A novel probabilistic and incremental method for estimating uncertainties in 3D feature point estimates. Uncertainties are used as a measure to discard unreliable and irrelevant 3D feature tracks. Modeling the noise in 2D feature tracks and 3D camera positions as Gaussian distributions, it is shown that the uncertainty in 3D feature estimate can be incrementally updated in constant time, independent of track length using linearized error propagation techniques.

4. A novel method for fast and hybrid clustering of reliable 3D feature tracks into clusters based on 3D proximity and image appearance similarity information. Such clusters are considered to represent 3D cloud formations and can be output to a display or input to a path planning algorithm.

5. A novel method to autonomously generate way points to avoid clouds while following FAA VFR for cloud avoidance.

6. A novel framework to jointly avoid clouds as well as other air traffic that may be present in the vicinity.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
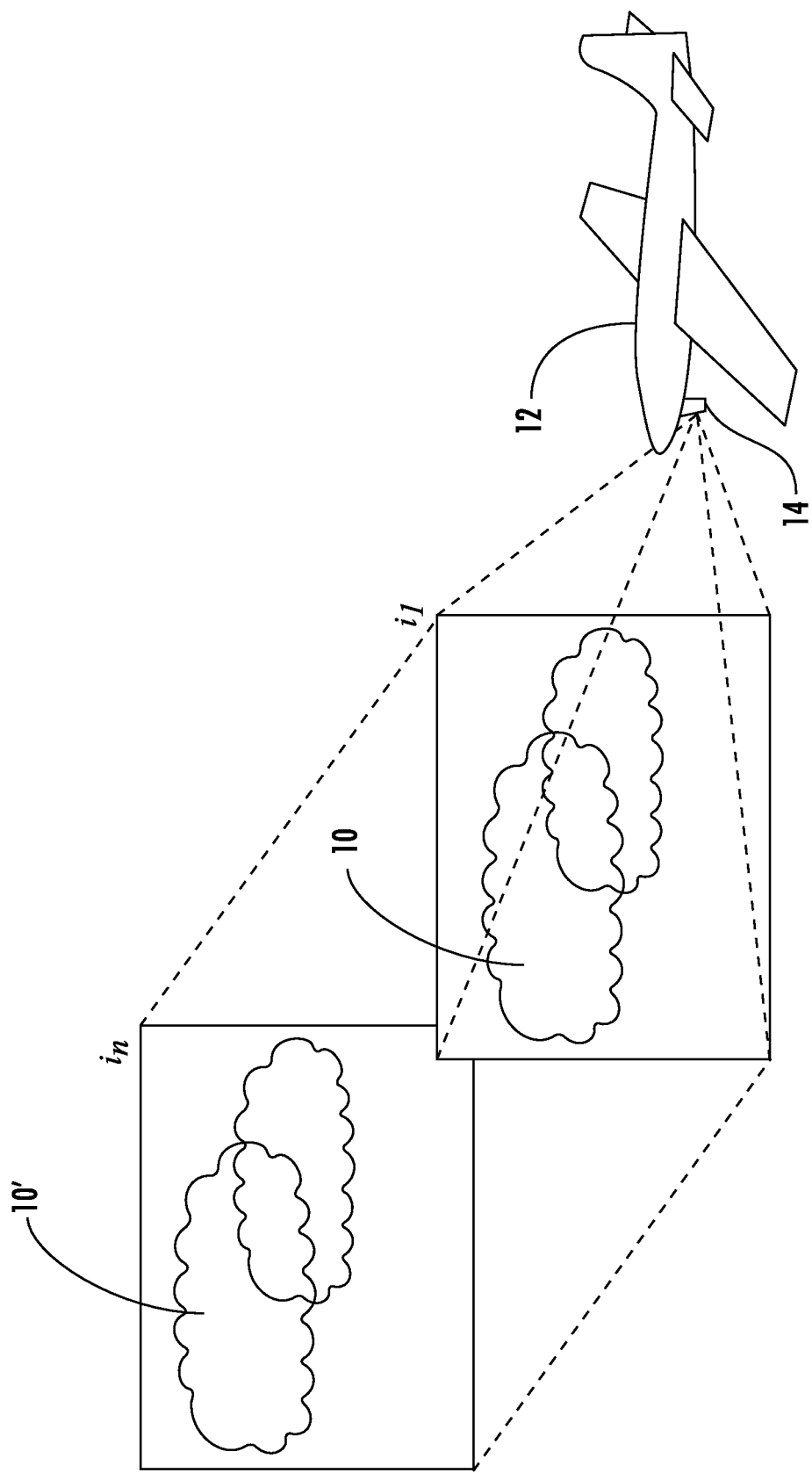
FIG. 1 is an illustration of a UAS/RPA and clouds within the field of view of the camera, and the consecutive acquisition of a series of images.
Figure 2:
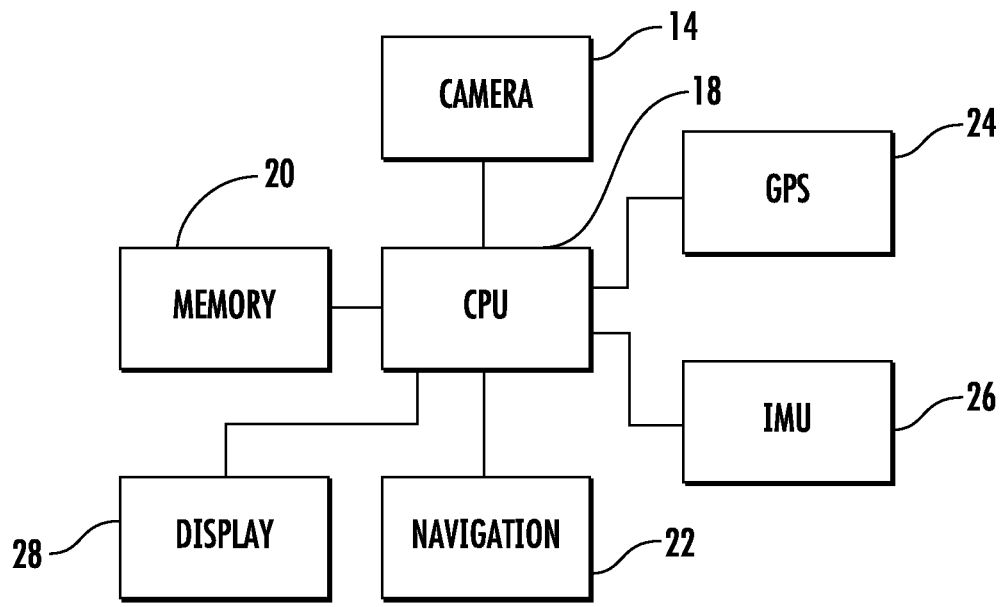
FIG. 2 is a schematic block diagram of the computerized system in accordance with the invention.
Figure 4:
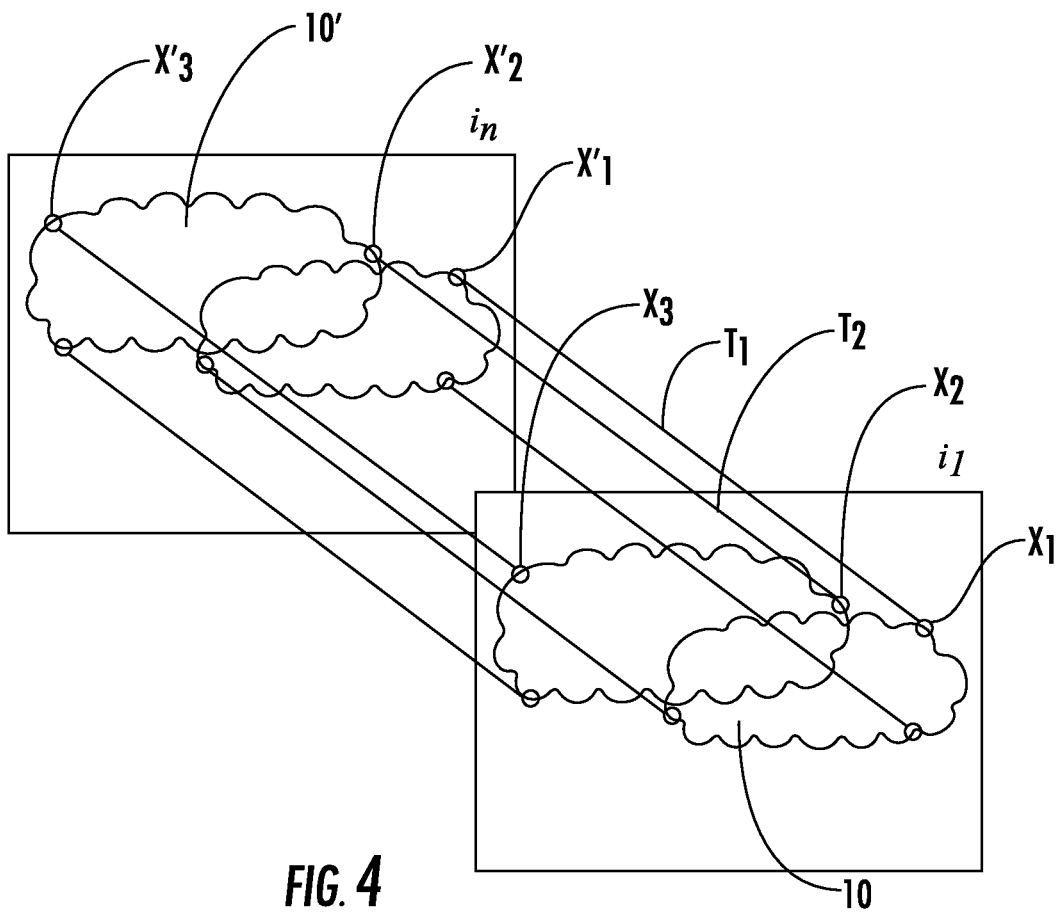
FIG. 4 is an illustration of sequential images including identified feature points and tracks established linking the common feature points.

Referring to FIGS. 1-4, the invention in this disclosure concerns a novel method to detect and avoid cloud formations 10 from a mobile platform (UAS/RPA) 12 using a monocular passive camera 14, such as an electro-optical (EO) or infrared (IR) camera, mounted on the platform 12. The primary application of the proposed technology is in the area of autonomous navigation of unmanned aircraft systems (UAS/RPA). A UAS/RPA 12 equipped with the present system can use the system to automatically detect and avoid cloud formations to conform with FAA VMC protocols. As can be seen in FIG. 1, the exemplary embodiment shows a UAS/RPA 12 acquiring a plurality of images ($i_1$-$i_n$) in a field of view of the camera 14. The system will then use those images to create macro representations of cloud formations 10 and adjust a future trajectory of the UAS/RPA to avoid the cloud formations. Specifically, the invention can be used to process images from a monocular camera 14 mounted on a UAS/RPA to detect, reconstruct and avoid cloud formations in 3D, thereby having due-regard for the safety of other air traffic in the airspace. In general, the invention can process information from multiple cameras (when available) to improve performance. Secondary applications of the inventions include detection and avoidance of man-made obstacles by UAS/RPA platforms 12 in low-flying urban environments and natural obstacles such as terrains and mountains. Additionally, an application of the invention includes cloud detection for remotely piloted aircraft (RPA) where the cloud formation data or images are provided to a remote pilot.

Generally, the invention is implemented in a computerized system including a processing unit (CPU) 18, memory 20, a camera 14. The processing unit can comprise any suitable computing platform as desired and could be augmented or replaced by a graphics processing unit (GPU) or a field programmable gate array (FPGA). The system communicates with the UAS/RPA autonomous navigation system 22 and receives inputs from the UAS/RPA global positioning system (GPS) 24 and inertial measurement unit (IMU) 26 via appropriate interfaces. In an RPA, the system may further include a display device 28 for displaying the data to an end user/remote pilot.

Figure 3:
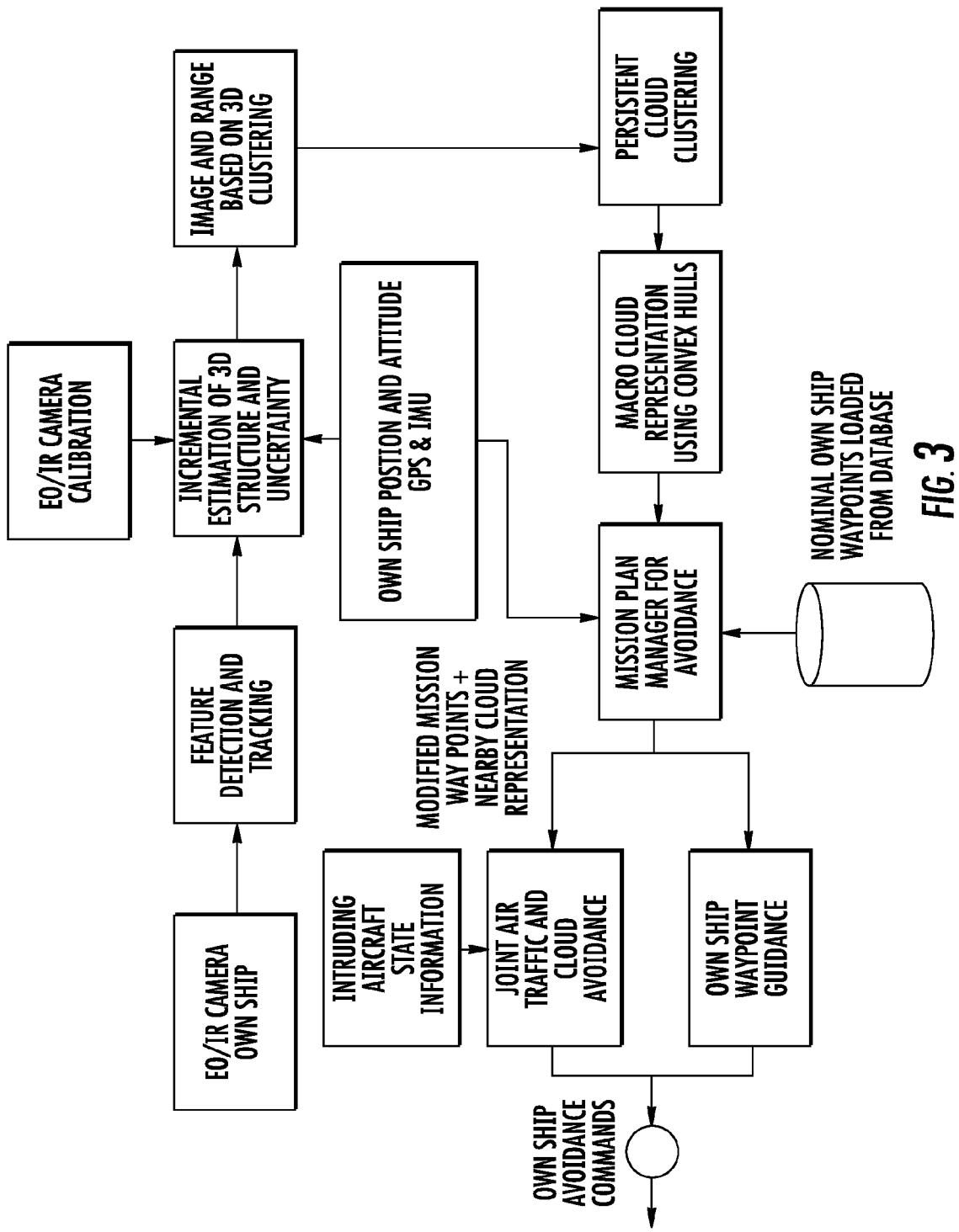
FIG. 3 is a high level block diagram of the functional aspects of the proposed system.

FIG. 3 shows the high-level block diagram of the proposed solution for cloud detection and avoidance. The following steps enumerate the functions carried out by individual modules shown in FIG. 3.

For every image captured by the EO/IR camera, salient feature points X are detected and tracked as 2-dimensional (2D) feature tracks T (See FIG. 4) using a standard Kanade-Lucas-Tomasi (KLT) feature tracker. A pyramidal implementation of this tracker allows robust and fast tracking of several thousand feature points X for images. When using color cameras, feature detection and tracking are done after converting input images from color to grayscale format.

It is assumed that the own-ship GPS (Global Positioning System) data and IMU (Inertial Measurement Unit) data are known for every input image. However, in practice, the GPS, IMU and camera sensors are operating at different frame rates. Hence, an own-ship GPS and IMU data packet is made available for every image by synchronizing all the sensors to the closest measurement received. It is also assumed that the camera is intrinsically calibrated (i.e.) it's intrinsic calibration parameters such as focal length, principal point, aspect ratio, skew, lens distortion, etc. are known. Additionally, the extrinsic calibration information between the IMU sensor and the camera are assumed known. Extrinsic calibration refers to the 3D translation and 3D rotation that would align the Cartesian coordinate systems of the camera and IMU sensor.

For every feature track, it's 3-dimensional (3D) position in a reference coordinate system (same reference system as the GPS and IMU devices) and the associated uncertainty are estimated by a novel parametric incremental least squares approach. The module in FIG. 3 that implements this approach is named Incremental Estimation of 3D Structure and Uncertainty.

A sequence of flags implementing geometric and heuristic constraints are used to select a smaller list of reliable feature tracks to be used later for clustering and avoidance.

In order to execute cloud avoidance in real-time, it is necessary to obtain a macro representation of cloud formations (See FIG. 5) from the sparse set of thousands of 3D feature tracks. Such a macro representation is obtained by clustering 3D feature tracks into groups based on 2 constraints, namely image appearance and 3D proximity. In order to cluster thousands of tracks in real-time, an efficient data structure (disjoint-set data structure) along with a fast clustering algorithm (union-find algorithm with optimizations including union-by-rank and path compression) are employed.

To avoid re-planning waypoints frequently, it is necessary to maintain track of cluster information over time (grouping of feature tracks). Persistent Cloud Clustering module tracks clusters by determining percentage of overlap in 3D between any 2 clusters from successive frames.

Tracked cloud clusters are converted to convex polytopes (FIG. 5) which are the preferred representation for the mission plan manager for cloud avoidance.

The Mission Plan Manager (MPM) takes as inputs (a) the convex polytope representation of the cloud clusters, (b) the own ship position and attitude from the GPS/IMU sensors, and (c) the nominal own ship way points from an on-board database and checks whether the nominal trajectory violates the FAA cloud avoidance rules. If a violation is found to occur, the MPM generates a new set of way points which avoids the clouds and maintains a safe distance from them. This new set of way points is communicated to the own ship's way point guidance module. If no violation is found to occur, the old set of way points is communicated to the way point guidance module. In addition to the way points, a representation of clouds that are close to the path defined by the way points is also communicated to the own ship's joint collision and cloud avoidance module. We refer to the clouds that are considered close to the own ship path as nearby clouds.

If no intruder is present, the own ship's vehicle guidance module issues commands to enable the own ship to follow the way points. If an intruder is present and is found to be on a collision course with the own ship, then the joint cloud and collision avoidance module ensures that a collision with the intruder is avoided while ensuring that the own ship does not violate the FAA Visual Flight Rules by blundering close to the nearby clouds.

Figure 6:
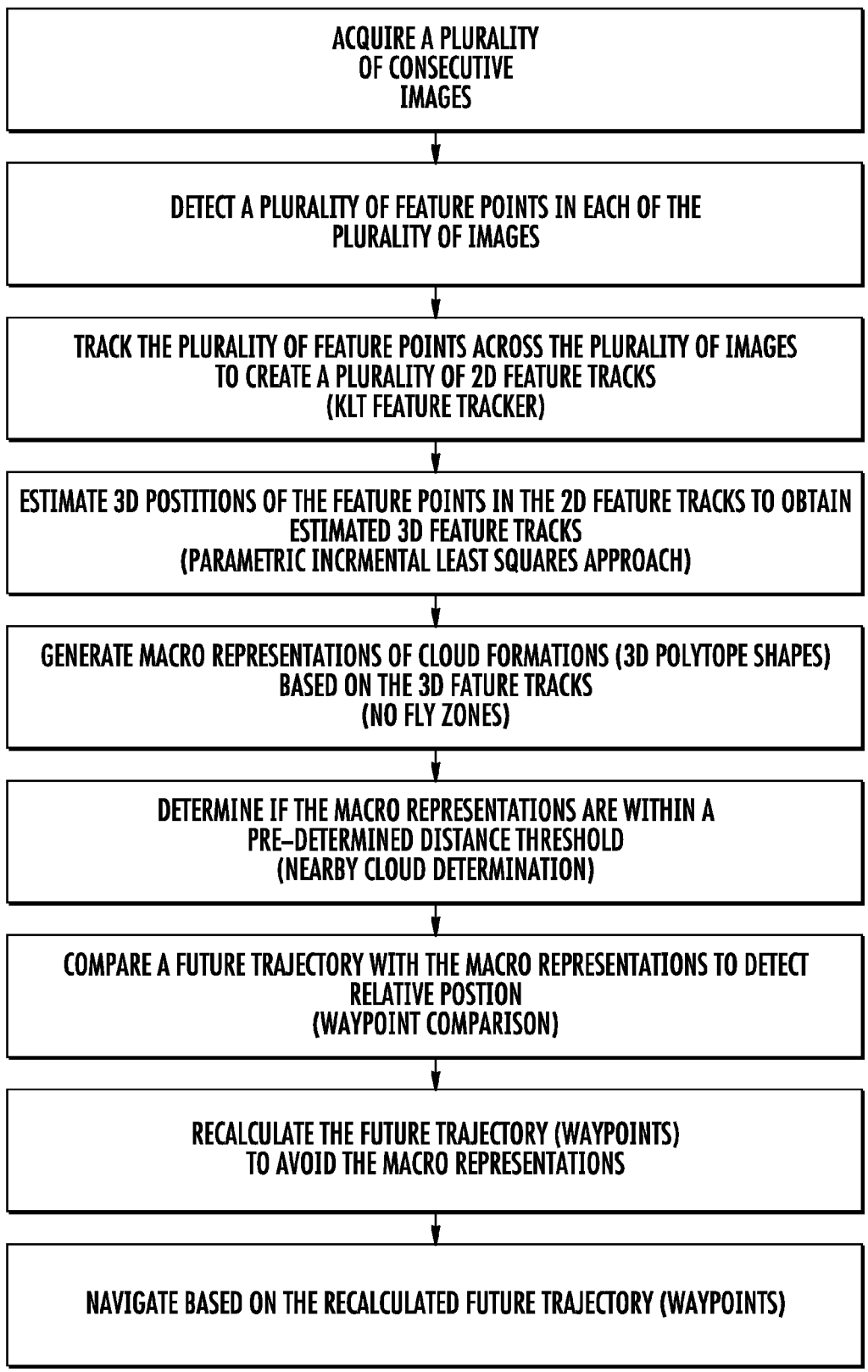
FIG. 6 is a flow chart showing the sequential steps to accomplish the methodology.

A flow chart implementing the basic approach as used herein is illustrated in FIG. 6.

Section 1 outlines a standard approach used for feature detection and tracking in grayscale images. Section 2 describes our novel incremental estimation framework capable of estimating the 3D position and uncertainty of several thousand feature tracks in real-time. Section 3 presents our novel approach for clustering 3D feature tracks in to groups and tracking such clusters over time in real-time. Section 4 describes our novel path planning algorithm that generates own ship waypoints to avoid cloud formation or clusters in accordance with FAA VFR and own ship maneuver constraints. Section 5 describes the novel framework for joint cloud and air traffic avoidance.

1. Feature Detection and Tracking

A standard pyramidal Kanade-Lucas-Tomasi (KLT) algorithm is employed for detecting and tracking features in grayscale image sequences. Note that the proposed approach can be easily scaled to handle information from color and/or Infra-red cameras. Presented here is a specific instance of the approach for grayscale image sequences. The assumption here is that different cloud formations appear sufficiently textured in grayscale images. In order to extract 3D extent of cloud formations, it is sufficient to reconstruct 3D positions of large number of feature points X lying on such textured regions. For this problem, the KLT algorithm incorporates both detection and tracking into a single formulation such that the points X selected are guaranteed to be points that are in textured regions, have corner-like appearance and are easy to track. Since KLT algorithm is standard in computer vision literature and is not our contribution, it is not discussed further in detail here. We have tweaked the KLT algorithm parameters so that several thousand feature points are tracked for every image. Although not a sufficiently dense representation, large numbers of feature points X provide a good starting point to perform clustering and extract convex hull information in 3D corresponding to cloud formations, which are later on used for path planning and cloud avoidance.

2. Incremental Estimation of 3D Structure and Uncertainty

Once features have been detected and tracked (see tracks T in FIG. 4), the next step is to reconstruct their 3D positions in a reference coordinate frame containing the own-ship and also estimate the uncertainty in 3D estimates. Sections 2.1 and 2.2 describe the novel approaches for 3D structure and uncertainty estimation respectively.

2.1 Incremental 3D Structure Estimation

Figure 7A:
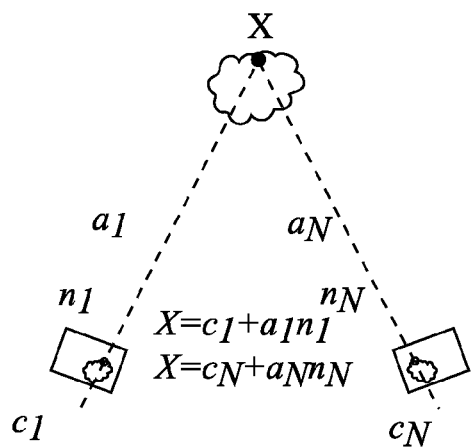
FIG. 7a is an illustration of a two-view feature point ranging approach.

In this section, we provide the formulation for 3D reconstruction of a single feature track. The same algorithm is executed independently and in parallel for other feature tracks. Let us consider the problem of reconstructing the 3D coordinates of a feature point X given a list of 2D positions $\{p_i\}_{i=1}^N$ tracked over N images. Let $\{p_i^w\}_{i=1}^N$ be the corresponding list of 3D positions obtained by transforming 2D positions from the image plane to a reference coordinate frame (here, the reference frame corresponds to the canonical frame in which GPS/IMU measurements are observed). This transformation, represented by a perspective projection, is trivial to compute given GPS/IMU and intrinsic camera information (focal length in pixels, principal point, skew and lens distortion). In our system, the above information is known a priori. For each 2D point $p_i^w$, we construct a unit vector, $$n_i = \frac{p_i^w - c_i}{\|p_i^w - c_i\|},$$

representing the direction (bearing) along which the feature point is observed for the $i^{th}$ image (see FIG. 7a). Here, $c_i$ is the 3d position of camera (corresponding to the $i^{th}$ image) measured using a GPS device. Given a single measurement pair $(n_i, c_i)$, the true 3D position x is related to the measurement pair by the parametric form of a 3D line:

$X = c_i + a_i * n_i$, where $a_i$ is a scalar parameter.

Figure 7B:
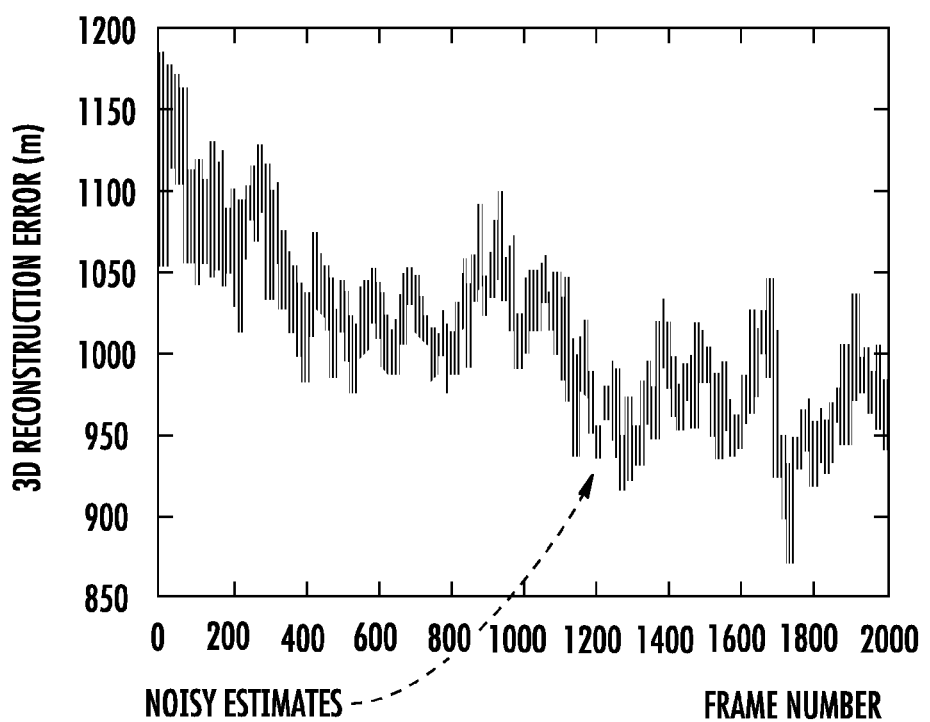
FIG. 7b is a graphical illustration of noisy 3D reconstruction errors as a function of time.

For N noiseless measurement pairs, N=2 is sufficient to recover the parameters $(a_1, a_2)$ and therefore, the 3D point X. Noiseless measurements are rarely recorded in practice and are not considered here. Resorting to the general noisy measurement scenario, it can be seen that given two noisy measurement pairs, it is in fact possible to obtain $(a_1, a_2)$ (and therefore, x) as the solution to a 2×2 linear least squares problem. However, this formulation does not generalize easily to N noisy measurement pairs since there are more unknowns than the number of equations (specifically, N+3 unknowns: one parameter for each line and the 3d point x coordinates). Also, estimation of a 3D point x using only two measurements (first and most recent) results in temporally flickering estimates as shown in FIG. 7(b). Alternatively, let us consider the following formulation where optimal estimate for x is one that minimizes the following cost function:

$$\hat{X}_N = \min_X \sum_{i=1}^N f(X, c_i, n_i),$$

where $f(.)$ is defined as follows:

$f(X, c_i, n_i) = \min g(X, c_i, n_i, a_i)$ And $g(X, c_i, n_i, a_i) = \|X - (c_i + a_i * n_i)\|^2$ Differentiating $g(.)$ with respect to $a_i$ and setting the same to zero gives the expression for $a_i$ that minimizes $g(.)$: $\hat{a}_i = (X - c_i)^T n_i$, where T symbol denotes vector transpose. This provides the expression for $f(X, c_i, n_1)$:

$f(X, c_i, n_i) = \|(I_{3\times3} - n_i n_i^T)X - (I_{3\times3} - n_i n_i^T)c_i\|^2$, where $I_{3\times3}$ is a 3×3 identity matrix.

Substituting for $f(.)$ in the above cost function gives:

$$\hat{X}_N = \min_X \sum_{i=1}^N \|(I_{3\times3} - n_i n_i^T)X - (I_{3\times3} - n_i n_i^T)c_i\|^2$$

Figure 8A:
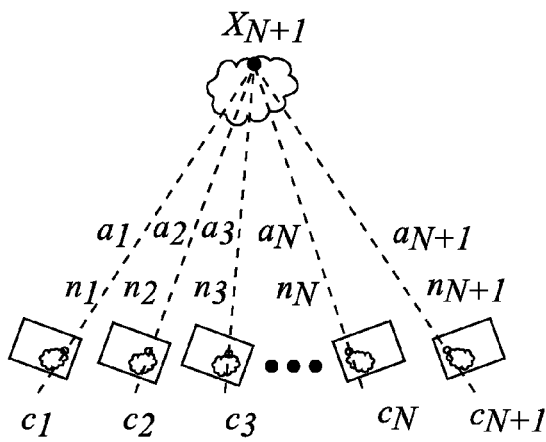
FIG. 8a is an illustration of a multi-image incremental ranging approach.

The optimal estimate $\hat{X}_N$ that minimizes the above cost functions in the least squares sense is given by:

$$A_N \hat{X}_N = B_N, \text{ where } A_N = \sum_{i=1}^N (I_{3\times3} - n_i n_i^T) \text{ and}$$

$$B_N = \sum_{i=1}^N (I_{3\times3} - n_i n_i^T) c_i$$

Where the subscript N denotes the first N measurements. There are several advantages of using the above linear least squares formulation: 1) rather than just using the first and most recent measurements, the proposed approach uses all the recorded measurements to produce a temporally smooth and stable 3D estimate; 2) unlike batch approaches whose complexity increases proportional to the number of measurements N the complexity of the proposed approach is constant (i.e.) the optimal 3D estimate is always obtained as the solution to a small (3×3) linear least squares problem. This characteristic is illustrated in FIG. 8(a). Formally, the optimal 3D point estimate can be computed for $(N+1)^{th}$ image by first computing the (3×3)-matrix $A_{N+1}$ and (3×1)-vector $B_{N+1}$ from the current measurement pair $(n_{N+1}, c_{N+1})$, $A_N$ and $B_N$ followed by solving a 3×3 linear least squares problem involving $A_{N+1}$ and $B_{N+1}$. Hence, it is clear that the incremental approach combines the advantages of batch approaches and two-view based approaches: 1) it retains the accuracy and temporal smoothness properties (See FIG. 8(b)) of batch approaches by including all recorded measurements, and 2) it is computationally efficient (constant complexity, independent of N) which is a characteristic of two-view based triangulation methods. From the above equation, it should be clear that we are operating in Euclidean 3D coordinates. Since we are dealing with camera centers and direction vectors in 3D, we can easily incorporate additional measurements from stereo or multiple cameras that may be available on-board in the future.

2.2 Incremental Uncertainty Estimation

Figure 8B:
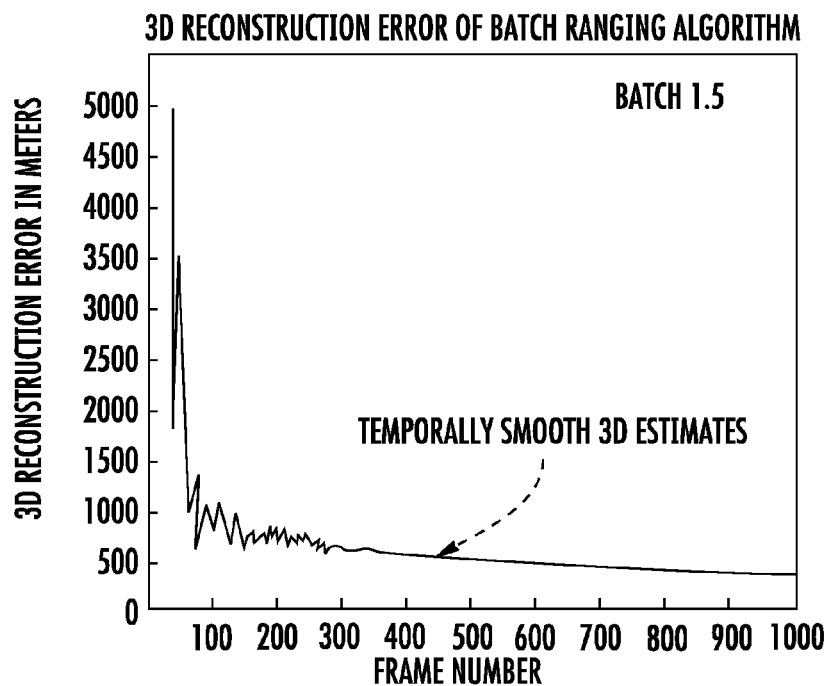
FIG. 8b is a graphical illustration of a smooth reconstruction error as a function of time obtained using an incremental approach.

The basic idea behind our feature ranging approach is the incremental computation of 3D feature point estimates that are optimal in the least squares sense, see FIGS. 8a and 8b. For a 2D feature track containing a list of 2D detections in pixel coordinates, the N-view feature ranging problem is formulated as follows (see previous section):

$$\left[\sum_{i=1}^N (I - n_i n_i^T)\right] X_N = \sum_{i=1}^N [(I - n_i n_i^T) c_i] \quad \text{Equation 1}$$

Notations $X_N$—Optimal 3D feature point estimate (meters), $X_N \in R^3$
N—Length of the 2D feature track $$I = \begin{pmatrix} 1 & 0 & 0 \\ 0 & 1 & 0 \\ 0 & 0 & 1 \end{pmatrix}, 3 \times 3 \text{ Identity matrix}$$

$n_N$—Direction vector for the $N^{th}$ 2D measurement, $n_N \in R^3$ and $\|n_N\| = 1$
$c_N$—$N^{th}$ camera position in world coordinates (meters), $c_N \in R^3$
$P_N = (x_N, y_N)$—$N^{th}$ 2D feature position in the image plane (pixels)

{$f$,(u,v),($s_x$,$s_y$)}—Intrinsic camera parameters, namely focal length (meters), principal point (pixels) and pixel size (meters)

Figure 9:
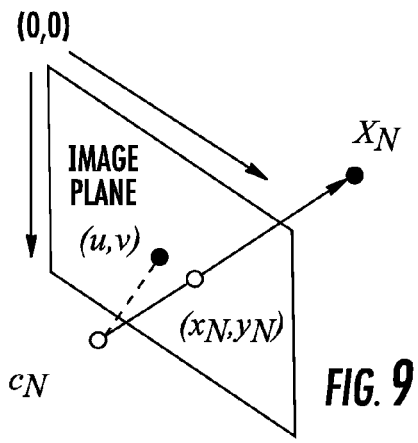
FIG. 9 is an illustration of a pinhole camera perspective projection model.

FIG. 9 shows a pinhole camera projection model. The parameters of this model are the intrinsic camera parameters defined by {$f$,(u,v),($s_x$,$s_y$)}. The unit direction vector $n_N$ can be derived from the measurements {($x_N$,$y_N$),$c_N$} and the intrinsic parameters as follows:

$$n_N = R_N^T \left[ \frac{(s_x(x_N-u) f\ s_y(v-y_N))^T}{\|(s_x(x_N-u) f\ s_y(v-y_N))\|} \right]$$ Equation 2

Where, $R_N$ represents the 3D rotation matrix from the world coordinate frame to the camera coordinate frame.

Ideally, an uncertainty measure should take into account the estimates of noise levels in input measurements and output the uncertainty in 3D estimates in metric units, without requiring ad-hoc normalization factors. This directly translates into a measure of confidence on the estimated values and provides uncertainty information that can be exploited by cloud avoidance and other modules. A probabilistic uncertainty measure is derived below with the above mentioned properties.

The objective is to find the uncertainty of the 3D point estimate $x_N$ given a set of N uncertain measurements {($x_i$,$y_i$), $c_i$}$_{i=1}^N$ along with the camera model parameters {$f$,(u,v),($s_x$,$s_y$),$R_N$}. Assuming that all the random vectors arise from Gaussian distributions, the uncertainties associated with ($x_i$, $y_i$), $c_i$ and $x_N$ can be expressed using covariance matrices $\Sigma_{xy_i}$, $\Sigma_{c_i}$ and $\Sigma_{X_N}$ respectively. For example, if one had prior knowledge about the standard deviation of noise in ($x_i$, $y_i$) to be ($\sigma_{xi}$,$\sigma_{yi}$), this can be specified through $\Sigma_{xy_i}$ as:

$$\Sigma_{xy_i} = \begin{pmatrix} \sigma_{xi}^2 & 0 \\ 0 & \sigma_{yi}^2 \end{pmatrix}$$ Equation 3

Here, we have assumed that $\Sigma_{xy_i}$ is diagonal with zero covariance between $x_i$ and $y_i$. We have seen that this assumption is sufficient for our application. If a better way of estimating $\Sigma_{xy_i}$ from image data is available, this knowledge can be incorporated without any additional cost. A similar argument applies to $\Sigma_{c_i}$ as well. In order to simplify calculations, we assume that the 3D rotation matrix $R_i$ is deterministic (i.e.) no noise. In the following, we describe two approaches for estimating the uncertainty given input parameters.

A) Batch Approach for Uncertainty Estimation

Equation 1 can be rewritten in the following way:

$$X_N = \left[ \sum_{i=1}^N (I - n_i n_i^T) \right]^{-1} \sum_{i=1}^N [(I - n_i n_i^T) c_i]$$ Equation 4

Or equivalently, $X_N = h(\{(x_1,y_1),\ldots,(x_N,y_N)\}, \{c_i,\ldots,c_N\})$ Equation 5

Here, camera model parameters {$f$,(u,v),($s_x$,$s_y$),$R_N$} are considered deterministic (i.e.) no noise. The function h(.) is inherently non-linear due to the presence of quadratic terms $n_i n_i^T$ and non-linear projection terms (Equation 2). Hence, by using linearized error propagation techniques (LEP), the covariance matrix of $X_N$ can be approximated as follows.

Since Gaussian distributions are not preserved under non-linear transformations, the covariance matrix $\Sigma_{X_N}$ is only an approximation.

$$\Sigma_{X_N} = J_N \Sigma_N J_N^T$$ Equation 6

Where, $J_N$ is the Jacobian matrix of first partial derivatives and $\Sigma_N$ is a block diagonal matrix with the measurement covariance matrices stacked along the leading diagonal (Equation 7 and Equation 8). It is to be noted here that h(.) is a function of 5N variables at any given instant. As N increases, the form of h(.) and its partial derivatives $$\left\{ \frac{\partial h}{\partial [x_i\ y_i]} \frac{\partial h}{\partial c_i} \right\}_{i=1}^N$$

changes due to the addition of more variables. Without going into details, it can be shown that both $J_N$ and $\Sigma_N$ cannot be updated incrementally as N increases. Also, the dimensions of $J_N$ and $\Sigma_N$ are 3×5N and 5N×5N respectively. The complexity is directly proportional to N. In the following, we will derive an incremental version that has a constant complexity, independent of N.

$$J_N = \left( \left( \frac{\partial h}{\partial [x_1\ y_1]} \frac{\partial h}{\partial c_1} \right) \cdots \left( \frac{\partial h}{\partial [x_N\ y_N]} \frac{\partial h}{\partial c_N} \right) \right)$$ Equation 7

$$\Sigma_N = \begin{pmatrix} \Sigma_{xy_1} & & & & \\ & \Sigma_{c_1} & & & \\ & & \ddots & & \\ & & & \Sigma_{xy_N} & \\ & & & & \Sigma_{c_N} \end{pmatrix}$$ Equation 8

B) Incremental Approach for Uncertainty Estimation

Here, we derive an incremental framework for uncertainty computation. Rather than treating the current estimate $X_N$ as a function of all N measurements, the basic idea is to write $X_N$ as a function of the previous state $x_{N-1}$ and current measurement {($X_N$,$y_N$),$C_N$}.

$$X_N = g(X_{N-1},(x_N,y_N),c_N)$$ Equation 9

We will discuss shortly on how to derive g(.). Assuming that a functional form of g(.) exists, the uncertainty computation is greatly simplified as shown below:

$$\Sigma_{X_N} = J_N \Sigma_N J_N^T$$ Equation 10

$$J_N = \left( \frac{\partial g}{\partial X_{N-1}} \frac{\partial g}{\partial [x_N\ y_N]} \frac{\partial g}{\partial c_N} \right)$$ Equation 11

$$\Sigma_N = \begin{pmatrix} \Sigma_{X_{N-1}} & & \\ & \Sigma_{xy_N} & \\ & & \Sigma_{c_N} \end{pmatrix}$$ Equation 12

In the above formulation, the size of matrices $J_N$ and $\Sigma_N$ are always 3×8 and 8×8 respectively, independent of N. Also, given the previous state uncertainty $\Sigma_{X_{N-1}}$ and current measurement uncertainty $(\Sigma_{x_N y_N}, \Sigma_{c_N})$, it is possible to incrementally update $\Sigma_{X_N}$ since the complexity is constant, independent of N. By using the above framework, we have achieved a constant-complexity framework for computing uncertainties of 3D point estimates in metric units.

Having derived a constant-complexity framework, we now turn our attention to deriving the functional form of g(.) and its derivatives. Equation 1 can be expanded and rewritten as follows:

$$\left[\left[\sum_{i=1}^{N-1}(I-n_i n_i^T)\right]+(I-n_N n_N^T)\right] \quad \text{Equation 13}$$

$$X_N = \left[\sum_{i=1}^{N-1}(I-n_i n_i^T)c_i\right]+(I-n_N n_N^T)c_N$$

Let's introduce a matrix $A_{N-1}$ and a vector $b_{N-1}$ as follows:

$$A_{N-1} = \sum_{i=1}^{N-1}(I-n_i n_i^T) \quad \text{Equation 14}$$

and $$b_{N-1} = \sum_{i=1}^{N-1}[(I-n_i n_i^T)c_i]$$

Substituting Equation 14 in Equation 13, factoring out $A_{N-1}$ from the left and taking its inverse leads to the following form:

$$[I+A_{N-1}^{-1}(I-n_N n_N^T)]X_N = A_{N-1}^{-1}b_{N-1}+A_{N-1}^{-1}(I-n_N n_N^T)c_N \quad \text{Equation 15}$$

Note that the first term on the right side of the expression (i.e.) $A_{N-1}^{-1}b_{N-1}$ is the optimal 3D estimate $x_{N-1}$ from the previous instant N−1. Introducing two new terms $P_N$ and $q_N$, Equation 15 takes the following form:

$$X_{N-} = A_{N-1}^{-1}b_{N-1} \quad \text{Equation 16}$$

$$P_N = I+A_{N-1}^{-1}(I-n_N n_N^T) \text{ and } q_N = X_{N-1}+A_{N-1}^{-1}(I-n_N n_N^T)c_N \quad \text{Equation 17}$$

$$X_N = g(X_{N-1},(x_N,y_N),c_N) = P_N^{-1}q_N \quad \text{Equation 18}$$

Equation 18 shows g(.) as a function of previous state and current measurements. It is to be noted that $A_N$, its inverse $A_N^{-1}$ and $b_N$ are incrementally updated as new measurements are received. This recursive and causal nature is the main reason for the incremental nature of both ranging and uncertainty computation frameworks.

The final step is to compute the Jacobian matrix by computing partial derivatives of g(.) and updating the uncertainty $\Sigma_{X_N}$. Below is an outline of all the partial derivatives of g(.)

From Equation 18, it follows that:

$$\frac{\partial X_N}{\partial t} = -P_N^{-1}\frac{\partial P_N}{\partial t}P_N^{-1}q_N + P_N^{-1}\frac{\partial q_N}{\partial t}$$

Or equivalently, $$\frac{\partial X_N}{\partial t} = -P_N^{-1}\left[-\frac{\partial P_N}{\partial t}X_N + \frac{\partial q_N}{\partial t}\right] \quad \text{Equation 19}$$

In order to compute $$\frac{\partial X_N}{\partial t},$$

it is necessary to first compute $$\frac{\partial P_N}{\partial t} \text{ and } \frac{\partial q_N}{\partial t}.$$

The following partial derivatives are to be computed:

$$\frac{\partial g}{\partial X_{N-1}}, \frac{\partial g}{\partial [x_N \ y_N]} \text{ and } \frac{\partial g}{\partial c_N}.$$

Compute $$\frac{\partial g}{\partial X_{N-1}}:$$

$$\frac{\partial P_N}{\partial X_{N-1}} = \begin{bmatrix} 0 & 0 & 0 \\ 0 & 0 & 0 \\ 0 & 0 & 0 \end{bmatrix} \text{ and } \frac{\partial q_N}{\partial X_{N-1}} = \begin{bmatrix} 1 & 0 & 0 \\ 0 & 1 & 0 \\ 0 & 0 & 1 \end{bmatrix} \quad \text{Equation 20}$$

$$\frac{\partial g}{\partial X_{N-1}} = P_N^{-1}$$

Compute $$\frac{\partial g}{\partial c_N}:$$

$$\frac{\partial P_N}{\partial c_N} = \begin{bmatrix} 0 & 0 & 0 \\ 0 & 0 & 0 \\ 0 & 0 & 0 \end{bmatrix} \text{ and } \frac{\partial q_N}{\partial c_N} = A_{N-1}^{-1}(I-n_N n_N^T) \quad \text{Equation 21}$$

$$\frac{\partial g}{\partial c_N} = A_N^{-1}(I-n_N n_N^T)$$

Compute $$\frac{\partial g}{\partial [x_N \ y_N]}:$$

Using chain rule to express dependencies, we obtain the following expression:

$$\frac{\partial g}{\partial [x_N \ y_N]} = \left(\frac{\partial g}{\partial n_N}\right)\left(\frac{\partial n_N}{\partial [x_N \ y_N]}\right) \quad \text{Equation 22}$$

Let $n_N = (n_{N1} \ n_{N2} \ n_{N3})^T$ be a $3 \times 1$ vector and $$n_N n_N^T = \begin{pmatrix} n_{N1}^2 & n_{N1}n_{N2} & n_{N1}n_{N3} \\ n_{N1}n_{N2} & n_{N2}^2 & n_{N2}n_{N3} \\ n_{N1}n_{N3} & n_{N2}n_{N3} & n_{N3}^2 \end{pmatrix} \quad \text{Equation 23}$$

$$\frac{\partial g}{\partial n_N} = \left(\frac{\partial g}{\partial n_{N1}} \ \frac{\partial g}{\partial n_{N2}} \ \frac{\partial g}{\partial n_{N3}}\right)$$

Compute $$\frac{\partial g}{\partial n_{N1}}$$

as follows:

$$\frac{\partial P_N}{\partial n_{N1}} = -A_{N-1}^{-1}\frac{\partial (n_N n_N^T)}{\partial n_{N1}} = -A_{N-1}^{-1}\begin{pmatrix} 2n_{N1} & n_{N2} & n_{N3} \\ n_{N2} & 0 & 0 \\ n_{N3} & 0 & 0 \end{pmatrix} \quad \text{Equation 24}$$

$$\frac{\partial q_N}{\partial n_{N1}} = -A_{N-1}^{-1}\begin{pmatrix} 2n_{N1} & n_{N2} & n_{N3} \\ n_{N2} & 0 & 0 \\ n_{N3} & 0 & 0 \end{pmatrix}c_N$$

Therefore, $$\frac{\partial g}{\partial n_{N1}} = A_N^{-1}\begin{pmatrix} 2n_{N1} & n_{N2} & n_{N3} \\ n_{N2} & 0 & 0 \\ n_{N3} & 0 & 0 \end{pmatrix}(X_N - c_N)$$

Similarly, compute $$\frac{\partial g}{\partial n_{N2}} \text{ and } \frac{\partial g}{\partial n_{N3}}:$$

$$\frac{\partial P_N}{\partial n_{N2}} = -A_{N-1}^{-1}\frac{\partial (n_N n_N^T)}{\partial n_{N2}} = -A_{N-1}^{-1}\begin{pmatrix} 0 & n_{N1} & 0 \\ n_{N1} & 2n_{N2} & n_{N3} \\ 0 & n_{N3} & 0 \end{pmatrix} \quad \text{Equation 25}$$

$$\frac{\partial q_N}{\partial n_{N2}} = -A_{N-1}^{-1}\begin{pmatrix} 0 & n_{N1} & 0 \\ n_{N1} & 2n_{N2} & n_{N3} \\ 0 & n_{N3} & 0 \end{pmatrix}c_N$$

$$\frac{\partial g}{\partial n_{N2}} = A_N^{-1}\begin{pmatrix} 0 & n_{N1} & 0 \\ n_{N1} & 2n_{N2} & n_{N3} \\ 0 & n_{N3} & 0 \end{pmatrix}(X_N - c_N)$$

-continued $$\frac{\partial P_N}{\partial n_{N3}} = -A_{N-1}^{-1}\frac{\partial (n_N n_N^T)}{\partial n_{N3}} = -A_{N-1}^{-1}\begin{pmatrix} 0 & 0 & n_{N1} \\ 0 & 0 & n_{N2} \\ n_{N1} & n_{N2} & 2n_{N3} \end{pmatrix} \quad \text{Equation 26}$$

$$\frac{\partial q_N}{\partial n_{N3}} = -A_{N-1}^{-1}\begin{pmatrix} 0 & 0 & n_{N1} \\ 0 & 0 & n_{N2} \\ n_{N1} & n_{N2} & 2n_{N3} \end{pmatrix}c_N$$

$$\frac{\partial g}{\partial n_{N3}} = A_N^{-1}\begin{pmatrix} 0 & 0 & n_{N1} \\ 0 & 0 & n_{N2} \\ n_{N1} & n_{N2} & 2n_{N3} \end{pmatrix}(X_N - c_N)$$

Finally, the partial derivatives $$\frac{\partial n_N}{\partial [x_N \ y_N]}$$

are computed from Equation 2 as follows:

$$\frac{\partial n_N}{\partial [x_N \ y_N]} = R_N^T\left(\frac{\partial n_N}{\partial x_N} \ \frac{\partial n_N}{\partial y_N}\right) \quad \text{Equation 27}$$

Let $\|xy_N\| = \sqrt{(s_x(x_N - u))^2 + (f)^2 + (s_y(v - y_N))^2}$ $$\frac{\partial n_{N1}}{\partial x_N} = s_x\left(\frac{1}{\|xy_N\|} - \frac{(s_x(x_N - u))^2}{(\|xy_N\|)^3}\right)$$

$$\frac{\partial n_{N2}}{\partial x_N} = s_x\left(\frac{-f(s_x(x_N - u))}{(\|xy_N\|)^3}\right)$$

$$\frac{\partial n_{N3}}{\partial x_N} = s_x\left(\frac{-s_x(x_N - u)s_y(v - y_N)}{(\|xy_N\|)^3}\right)$$

$$\frac{\partial n_N}{\partial x_N} = \begin{pmatrix} \frac{\partial n_{N1}}{\partial x_N} \\ \frac{\partial n_{N2}}{\partial x_N} \\ \frac{\partial n_{N3}}{\partial x_N} \end{pmatrix} \quad \text{Equation 28}$$

$$\frac{\partial n_{N1}}{\partial y_N} = s_y\left(\frac{s_x(x_N - u)s_y(v - y_N)}{(\|xy_N\|)^3}\right)$$

$$\frac{\partial n_{N2}}{\partial y_N} = s_y\left(\frac{f(s_y(v - y_N))}{(\|xy_N\|)^3}\right)$$

$$\frac{\partial n_{N3}}{\partial y_N} = s_y\left(\frac{-1}{\|xy_N\|} + \frac{(s_y(v - y_N))^2}{(\|xy_N\|)^3}\right)$$

$$\frac{\partial n_N}{\partial y_N} = \begin{pmatrix} \frac{\partial n_{N1}}{\partial y_N} \\ \frac{\partial n_{N2}}{\partial y_N} \\ \frac{\partial n_{N3}}{\partial y_N} \end{pmatrix} \quad \text{Equation 29}$$

Substitute Equation 23 to Equation 29 in Equation 22 to get the final closed form expression for $$\frac{\partial g}{\partial [x_N \ y_N]}.$$

3. Image & Range Based Persistent 3D Cloud Clustering

The following sections describe the steps necessary for converting 3D feature tracks and their estimated uncertainties into convex hull representations that can be used for cloud avoidance purposes.

3.1 Pre-Processing 3D Feature Tracks

Before 3D tracks are grouped into clusters, it is necessary to refine the list of tracks T into a smaller list consisting of only accurate and reliable tracks. This pre-processing step is critical since large errors in 3D structure estimation can negatively and severely affect the output of path planning algorithm. We have implemented 3 constraints to achieve this refinement:

1. A 3D feature track whose estimated uncertainty is greater than a preset threshold is deemed unreliable and is discarded.
2. A 3D feature track whose estimated altitude is greater than a preset threshold (500 meters) and has a low uncertainty is deemed to be a point very close to the ground and is not considered to be a cloud point. Since we are interested in avoiding only cloud formations, this constraint is important to remove feature tracks from highly textured ground regions.
3. A feature track whose reconstructed 3D position lies behind image plane of the camera (due to triangulation errors) is considered irrelevant and is discarded.

3.2 3D Cloud Clustering

Once unreliable and irrelevant feature tracks are discarded, the refined list of feature tracks T is used for clustering. A novel approach for clustering 3D feature tracks incorporates both 3D range information and image information to deduce which tracks belong to the same cloud formation. The main clustering algorithm employed is agglomerative clustering, described below:

Given a set of 3D estimates $X=\{X_1, X_2, \ldots, X_N\}$ corresponding to N feature tracks, the corresponding 2D feature points for the 3D estimates in X, $x=\{x_1, x_2, \ldots, x_n\}$, and a set of cluster labels $L(X)=\{1, 2, \ldots, N\}$.
1. Initialize $L(X_i)=i$
2. For each pair $(X_i, X_j)$ in X
3. If Distance$(X_i, X_j)<e$
4. For every $X_a$ in X for which $L(X_a)=L(X_i)$,
5. Set $L(X_a)=L(X_j)$ The end result of this algorithm is that each $X_i$ is given a label indicating its cluster membership. The major influencing factor in the algorithm above is the Distance( ) function, which returns the distance between two points. Our distance function, which incorporates both 3D range and image information, is explained in section 3.2.2.

It is trivial to deduce the worst case run-time complexity of the above algorithm to be $O(N^2)$. For the large no. of tracked feature points in our application, usually lying in the range of 1000, the computation time reaches 600 milliseconds for the 3D clustering module alone on a desktop PC. Given that there are much more constrained and less powerful processors onboard a UAS/RPA, we would like to have an algorithm that is functionally equivalent to agglomerative clustering, with a much lower run-time complexity for the same number of features. The next sub-sections describe the optimizations that have been performed to restrict computation time.

3.2.1 Algorithm Optimization: Disjoint Set Data Structure (DSD)

A disjoint set data structure is best suited for set partition problems. Given a set of elements, the goal is to partition into a number of non-overlapping & separate sets DSD. The partitioning can be done based on different criteria, the most common one being a distance metric. In our application, we use the distance function mentioned in section 3.2.2. The primitive operations executed on this data structure are the union, find and make-set operations. Let us consider the simple problem of clustering 2 elements belonging to 2 separate sets. A typical clustering operation using this data structure entails executing the following primitive operations in order. These 3 primitive operations constitute the basic elements of a union-find algorithm.

Make-set: Given a new element, create a new set containing only this element.
Find: Find the membership (set ID) of a particular element.
Union: Given 2 elements & their membership, merge the 2 sets if the 2 elements are close enough.

A unique ID or representative is required to uniquely identify a particular set. It is common to assign the $1^{st}$ element used to create a set as its representative in most manifestations of the union-find algorithm. Standard implementations of this data structure, such as the Boost C++ library, use optimized algorithms for one or more primitives. In our implementation, we use the disjoint set forests and incremental connected components from the Boost C++ library (BLG). Next, we describe the disjoint set forest implementation, analyze its complexity and list the advantages.

A disjoint-set forest is a data structure where each set is represented by a tree data structure, with the root node corresponding to its representative element DSD. Each non-root node stores a reference to its parent node. The 3 primitive operations discussed earlier map to operations on this data structure as described below:

Make-set: Given a new element, create a new tree with this element as its root node (i.e., its representative).
Find: Starting from the node corresponding to the current element, traverse up the tree following parent nodes, terminating upon reaching the representative or root node.
Union: Given 2 elements & their membership trees, merge the 2 sets if the 2 elements are close enough. Merging is done by attaching the root node of one tree to the other.

A union-find algorithm working on this data structure is still not optimal in run-time complexity. There are several element configurations that could form highly unbalanced trees. Two optimizations are employed by Boost (BLG) namely union by rank and path compression that result in asymptotically optimal complexities. Union by rank prevents the formation of unbalanced trees for different sets while path compression flattens the tree structure in a way such that each node holds a direct reference to the root node, rather than referring to its parent node. Direct references to root nodes significantly reduce traverse time, hence optimizing Find operations. The combination of union by rank and path compression results in a run-time complexity of $O(V+E)$, where $V=N$ & E is the no. of edges in the graph after the clustering is completed. It is to be noted that a significant speed up is obtained since in our application, E is usually much lesser than the total no. of possible edges $N^2$.

Using the above data structure, our 3D clustering algorithm is able to cluster 1000 features in less than 40 milliseconds, which is an order of magnitude faster than using a naïve implementation of agglomerative clustering.

3.2.2 Distance( ) Function

We have devised a novel Distance( ) function for clustering that fuses range estimates with image-based information. If we had accurate information about which pixels belonged to clouds and which didn't, we could more easily determine which 3D points should be grouped together. Determining that assignment is an unsolved research problem, but we can leverage simple thresholding or classification techniques to get estimates of which pixels belong to cloud and which belong to background. Using this information, we have created the following distance function. Additional information from color cameras can be exploited (when available) by this algorithm to improve performance.

Distance($x_i$, $x_j$, cloud_label):

Given a labeling of individual pixels classifying them as "cloud" or "not cloud" in the matrix cloud_label, 1. Find connected components within the cloud_label map such that every pixel is given a label indicating an integer index of the cloud it belongs to, or 0 for non-cloud pixels.

2. $d_1 = \sqrt{(x_i - x_j)^2}$

3. If cloud_label($x_i$)!=cloud_label($x_j$)
    $d_1 = d_1 + 1e10$

4. Return d

The algorithm starts by measuring the 3D distance between the two points. If both points are on different cloud masses in the image, however, it then adds a prohibitive distance penalty to the two points, indicating that they cannot possibly be on the same cloud in 3D. This penalty ensures that we do not cross non-cloud regions to connect points on different clouds just because our estimates indicate that they are close in 3D. Because of this penalty, we can also increase our distance threshold so that we can jump over any homogeneous regions, should they arise, without the risk of connecting across non-cloud regions. Thus, by setting a suitably high distance threshold (1000 m in our experiments) and separating cloud points using image data, we create a distance function that can handle a wide array of cloud types and still cluster accurately.

3.3 Persistent Clustering or Tracking

A method for performing data association of cloud clusters over time in order to track them is presented here. This is necessary in order to avoid re-planning waypoints frequently. The objective of this module is to persistently maintain a list of tracked cloud clusters.

1. When the module is turned on, the list of tracked cloud clusters is empty. This list is initialized with all the clusters detected in the first frame captured.

2. For each new frame, we attempt to associate a new cluster of points to one of the existing clusters in the previous frame. For every pair of a new cluster and an existing cluster, a matching score (or inversely, its cost) is computed by counting the number of points that are commonly shared. Once all scores are computed and populated in a 2D cost matrix, the optimal association between the two lists of new and existing clusters is achieved through the Hungarian assignment algorithm. Furthermore, a new cluster and an existing cluster are assigned the same track ID only if the percentage of common points exceeds a certain threshold in both clusters.

3. New clusters that are not assigned to any existing cluster initiate new cloud cluster tracks.

4. Old cloud clusters that are not assigned to new clusters terminate their track.

4. Mission Plan Manager for Cloud Avoidance

The Mission Plan Manager (MPM) performs the following functions. First, it checks whether the existing own ship path violates the FAA VFR for cloud avoidance. Second, it generates modified way points if an impending violation of the FAA rules is found to occur. Third, it checks for the presence of nearby clouds and upon detecting them it creates a simplified representation of their shape which is communicated to the joint collision and cloud avoidance module.

4.1 FAA VFR Violation Detection

The FAA VFR prescribe minimum horizontal, top and bottom separations with the own ship while avoiding clouds. The own ship's future trajectory is specified as a collection of way points. In other words, the future trajectory is approximated as a piecewise linear path. Moreover, as described earlier, each connected cloud component is approximated as a convex polytope. Therefore, the problem of checking whether a given path satisfies or violates the FAA cloud avoidance rules can be reduced to the problem of checking whether the distance between a line segment and a convex polytope is greater than the specified FAA separation thresholds. Each convex polytope is a collection of convex polygonal faces. The minimum distances of a line segment from a polytope satisfies the FAA constraints if and only if the minimum distances of the line segment from each of the faces of the polytope satisfies the FAA constraints. This defines our approach to constraint checking We now describe the mathematical formulation of the problem. First, let $d_{top}$, $d_{bottom}$ and $d_{lat}$ at denote the FAA specified minimum top, bottom and lateral clearances from a cloud. Now, the set of points belonging to a line segment joining two points $p_0$ and $p_1$ can be represented by:

$$p(t) := p_0 + t(p_1 - p_0),\ 0 \le t \le 1$$

Here $p_0$ and $p_1$ represent two consecutive points on the candidate trajectory. Each point on the line segment corresponds to a unique t. Let a polytope in 3 dimensions be defined as a collection of N faces where each face is a polygon. Let the number of vertices of face i be given by $n_i$. Let the vertices of face i be denoted by $\{v_1^i, \ldots, v_n^i\}$ where each vertex is a point in 3D. We drop the superscript in the notion for a vertex wherever the identity of the face is not important. Thus, the set of points belonging to a face of a polygon is given by:

$$\left\{ \sum_{i=1}^{n_i} \alpha_i v_{n_i},\ 0 \le \alpha_i \le 1,\ \sum_{i=1}^{n_i} \alpha_i = 1 \right\}$$

Each point on the face corresponds to a unique set of $a_i$'s. We now present an optimization problem the solution of which allows us to check whether a given line segment satisfies the minimum FAA constraints with respect to a polygonal face. The optimization problem is as follows:

Minimize $$\left( p_{0,x} + t(p_{1,x} - p_{0,x}) - \sum_{i=1}^{n_i} \alpha_i v_{i,x} \right)^2 + \left( p_{0,y} + t(p_{1,y} - p_{0,y}) - \sum_{i=1}^{n_i} \alpha_i v_{i,y} \right)^2$$

subject to the constraints that:

$$0 \le t \le 1$$

$$0 \le \alpha_i \le 1,\ \forall i$$

$$\sum_{i=1}^{n_i} \alpha_i = 1,$$

$$-d_{bottom} \le p_{0,z} + t(p_{1,z} - p_{0,z}) - \sum_{i=1}^{n_i} \alpha_i v_{i,z} \le d_{top}$$

In the above problem, the decision variables are t and $a_i$'s. Notice that the objective function is the square of the horizontal distance between the line segment and the polygonal face. We are interested in finding the minimum of the objective function. The first three constraints represent the constraints occurring in the definition of a polygonal face and a line segment. The last constraint is important. The term $$p_{0,z} + t(p_{1,z} - p_{0,z}) - \sum_{i=1}^{n_i} \alpha_i v_{i,z}$$

represents the horizontal distance between the line segment and the polygonal face. We are interested in finding only those solutions which violate the FAA top and bottom vertical separation constraints. If no such point exists, then we already know that the FAA constraints are not violated.

If, on the other hand, a feasible solution exists, then we need to check the value of the objective function at the optimum point. If the square root of the optimum value is less than $d_{lat}$, then the FAA violation constraints are violated. Thus, the existence of a feasible solution and the value of the optimum provide a straightforward check of whether the FAA separation constraints are violated. This brings us to the question, of how easy is to solve the above optimization problem. It turns out that the above optimization problem is a quadratic program which can be solved accurately, but it might require computational resources that might not be available on all UAS/RPA platforms. In such cases, other heuristics can be used to solve the problem depending on computational resources available on board at the expense of loss in accuracy.

4.2 Way Point Modification

If an impending violation of the FAA VFR concerning cloud avoidance is detected, then the own ship way points are modified so as to ensure compliance with the FAA VFR. The way point modification approach is now described. Our approach is based on the Rapidly Exploring Random Tree (RRT) method for path planning in robotics. Before describing our approach, let us first describe the precise problem formulation in mathematical terms.

Let $p_1, p_2, \ldots p_4$ be four future own ship waypoints. The objective of the way point modification module is to generate a new set of way points $p'_1, p'_2, \ldots p'_n$ such that the distance between $p_4$ and $p'_n$ is less than a design threshold $\delta$, the points $p_1, p'_1$ are identical, and the piecewise linear path described by the way point sequence $p'_1, p'_2, \ldots p'_n$ does not violate the FAA VFR and the air corridor constraints. We now describe the steps involved in our approach.

Figure 10A:
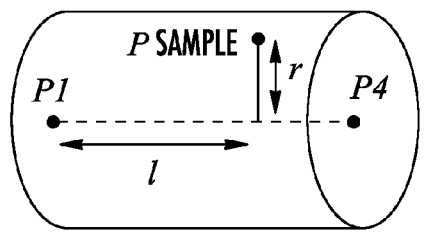
FIG. 10a is an illustration of the cylinder constructed in step 2 of the algorithm Path Planning.
Figure 10B:
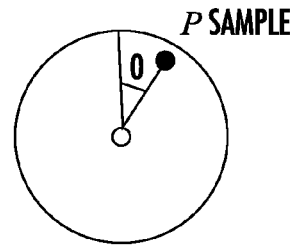
FIG. 10b is a cross-sectional view of the cylinder plane containing $P_{sample}$.

Algorithm: Path Planning
1. Initialize a graph G by setting the vertex set $V=\{p_1\}$ and an edge set $E=\emptyset$.
2. Construct a cylinder with its axis aligned along the line passing through $p_1$ and $p_4$, height equal to the length of the line segment joining $p_1$ and $p_4$, and with radius equal to a design threshold R. This cylinder is so constructed that the constructed path remains inside the air corridor defined by the FAA. One can construct or use a cuboid or a cube or any other closed 3D volume that complies with the FAA lateral air-corridor constraints.
3. Generate a number by sampling a uniform distribution over the interval between 0 and the cylinder height. Denote this number by l. Generate another number by uniformly sampling the interval between 0 and R; denote this number by r. Finally generate a third number by uniformly sampling the interval between 0 and $2\pi$; denote this number by $\theta$. Together, the triplet $(l,r,\theta)$ refers to the relative position of a point $p_{sample}$ inside the cylinder constructed in step 2 as shown in FIG. 10A. In other words, we have generated a sample point $p_{sample}$ inside the cylinder.
4. Check if the point $p_{sample}$ violates the FAA VFR by applying the method described in Section 4.1 by setting $p_0 = p_{sample}$ and $t=0$. The decision variables in this case are the $a_i$. Note that because $t=0$, there is no need to specify a $p_1$.
5. If the point $p_{sample}$ does not violate the FAA VFR, then compute the point in the set V that is nearest to p. Let this point be denoted by $v_{nearest}$.
6. Compute the location of the point, say $\acute{p}$, that is nearest to p that can be reached from $v_{nearest}$ in a given time $\Delta T$ while adhering to the own ships kino-dynamic constraints.
7. Add the point $\acute{p}$ to the set V. Add the edge $(v,\acute{p})$ to the set E.
8. If the distance between the point $\acute{p}$ and the point $p_4$ is less than the threshold $\delta$, then go to the next step, else repeat steps 4-9.
9. Find a path in the graph G from the point $p_1$ to the node in G that is the closest to $p_4$. Note that such a path is unique. Let this path be denoted by the sequence of points $\bar{p}_1, \bar{p}_2, \ldots \bar{p}_N$. Note that $\bar{p}_1 = p_1$ and the distance between $\bar{p}_n$ and $p_4$ is less than the threshold $\delta$ by construction.

At this stage, we have a path $\bar{p}_1, \bar{p}_2, \ldots \bar{p}_N$ which is a solution to the original problem posed at the beginning of Section 4.2. It may be possible to prune this path to reduce the number of way points. This is accomplished using the method described next.

Algorithm: Path Pruning
1. Set i=1. Let $q_i := \bar{p}_N$. Set j=N-1.
2. Check if the line segment joining points $\bar{p}_j$ and $q_i$ violates the FAA VFR constraints according to the method described in Section 4.1. If not, then set j=j-1 and repeat step 2 if j≠0 (if j=0 then go to step 3). If yes, then set i=i+1, $q_i = \bar{p}_{j-1}$ and repeat step 2.
3. Set $p'_1 = q_i, p'_2 = q_{i-1}, \ldots p'_i = q_1$
The pruned output $p'_1, p'_2, \ldots, p'_i$ is the set of modified way points for cloud avoidance.

4.3 Nearby Cloud Representation

A nearby cloud is defined as one whose minimum lateral or vertical distance from the own ship path, as defined by the waypoints, is less than pre-defined thresholds. For example, these thresholds may be a certain multiple of the FAA prescribed minimum horizontal, top and bottom separations. The knowledge of nearby clouds is required for the proposed framework for joint cloud and air traffic avoidance described later in Section 5. For way point modification, a convex hull representation of the clouds is used. For the purpose of joint cloud and air traffic avoidance, such a representation may prove too complex for computational reasons. Therefore, a simpler representation of the clouds is needed. This section describes this simplified representation.

Figure 5:
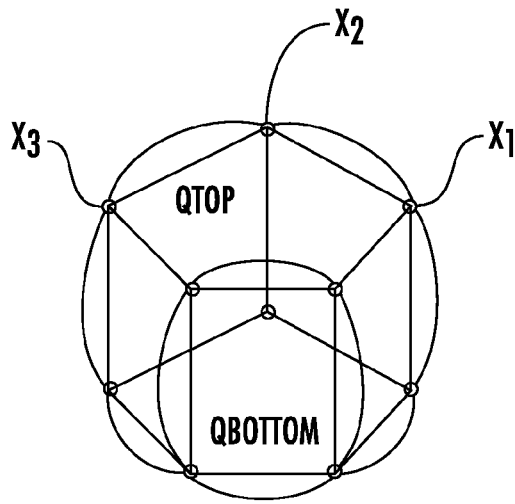
FIG. 5 is an illustration of a simplified macro representation of a cloud as detected with the system.

1. Each cloud is represented as a polytope.
2. The polytope consists of a top face $Q_{top}$ and a bottom face $Q_{bottom}$
3. The faces $Q_{top}$ and $Q_{bottom}$ are parallel to each other and to the plane Z=0.
4. Each vertex in $Q_{top}$ is vertical projection of the corresponding vertex of $Q_{bottom}$ as shown in FIG. 5.
5. The side faces of the polytope are constructed by joining the corresponding vertices of $Q_{top}$ and $Q_{bottom}$ Please refer to FIG. 5 for a graphical illustration. In order to communicate this representation to the joint cloud and collision avoidance module, we need only pass the latitude and longitude of the vertices of one of the top or bottom faces, and their altitudes.

5. Framework for Joint Cloud and Air Traffic (Collision) Avoidance

The previous section describes a method to generate waypoints to avoid clouds in accordance with the FAA VFR. A situation may arise where the own ship needs to avoid another air traffic and clouds at the same time. In this section, we present a novel framework that can be used for joint cloud and air traffic avoidance. Recall that the output of the mission plan manager is a set of waypoints and a representation of nearby clouds.

The framework for joint cloud and air traffic avoidance is characterized by the following properties:

1. Clouds are detected at distances much larger than air traffic.

2. Cloud avoidance way points are updated at a much slower rate than collision avoidance commands.

3. When computing the air traffic or collision avoidance maneuver, the regions representing nearby cloud are considered as no-fly zones, thereby preventing the own ship from entering these regions. The no-fly zone should be enforced as a soft constraint. The soft constraint implies that in the absence of a maneuver that avoids both the collision with the air traffic as well as the no fly zone, the own ship is allowed to enter the no-fly zone since avoiding collision has higher priority.

The novelties of the inventions described in this document and their respective advantages compared to state-of-the-art are enumerated below:

1. A novel monocular EO/IR camera based system design that can be used to endow UAS/RPA with autonomous cloud detection & avoidance capability. An EO/IR based due-regard system can ensure operation in VMC in situations where using radar sensors is not feasible such as undesired emission, size, weight and power constraints, etc. In general, the design is scalable to process information from multiple monocular, stereo, EO/IR grayscale or color cameras when available on-board.

2. A novel method for incremental estimation of 3D structure and uncertainty of large number of feature points on cloud formations in real-time. There are several advantages of our incremental approach over state-of-the-art. Firstly, the 3D estimates are provably optimal in least squares sense. Secondly, unlike batch approaches, the computational complexity for both 3D structure and uncertainty estimation is independent of track length and hence, incremental updates are much faster. This attribute allows tracking and reconstruction of several thousand feature points over temporally longer periods. Thirdly, measurement noise in 2D feature and 3D camera (own-ship) positions are probabilistically fused to estimate uncertainties in 3D feature estimates. Such uncertainties are used to successfully discard any un-reliable feature tracks. When available, additional 2D measurements from multiple cameras can be easily incorporated to improve accuracy.

3. We present a novel and fast method for clustering reliable 3D feature tracks into groups based on 3D proximity and image appearance similarity information. Using such synergistic attributes increases flexibility to handle diverse range of scenarios including textured and homogeneous clouds with large and small number of tracked features respectively.

4. A novel framework for joint cloud and air traffic avoidance for unmanned aircraft systems. Also, a novel approach to modify the own ship future way points so as the avoid clouds in accordance with the FAA Visual Flight Rules (VFR) and air corridor constraints.

For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an aircraft including a computerized aircraft navigation system, a method of detecting and displaying cloud formations comprising the steps of:
    acquiring with a camera, consecutively and in real time, a plurality of images within a field of view of the camera;
    providing said plurality of images to a central processing unit that is integrated with said camera,
    said central processing unit running a software application which is operative for
        receiving said plurality of images,
        detecting a plurality of feature points of cloud formations in each of said plurality of images,
        tracking said plurality of feature points across said plurality of images to create a plurality of 2-dimensional feature tracks,
        estimating 3-dimensional positions of said feature points in said 2-dimensional feature tracks to obtain estimated 3-dimensional feature tracks, and
        generating macro representations of said cloud formations based on said 3-dimensional feature tracks,
        wherein said step of generating said macro representations includes clustering said 3-dimensional feature tracks into cloud clusters, and wherein said step of clustering includes
            determining within said images pixels belonging to cloud formations and pixels belonging to background,
            measuring a distance between selected pixels using a distance function in 3-dimensional space,
            adding a prohibitive distance to said measured distance if said pixels are on different cloud formations, and
            setting a predetermined distance threshold for clustering whereby pixels on different cloud formations are not clustered; and
    displaying said generated macro representations of said cloud formations on a visual display integrated with said central processing unit.

2. The method of claim 1 wherein each 2-dimensional feature track is treated independently.

3. The method of claim 2 wherein said step of estimating 3-dimensional positions is based on said 2-dimensional tracks and aircraft system current position data for each image.

4. The method of claim 3 wherein said step of estimating 3-dimensional positions is accomplished by a parametric incremental least squares approach.

5. The method of claim 4 wherein said step of estimating 3-dimensional positions includes estimating uncertainties in said 3-dimensional positions.

6. The method of claim 1 wherein said step of obtaining macro representations of said cloud formations further comprises the step of converting said macro representations into convex polytope representations.

7. The method of claim 5 wherein said step of obtaining macro representations of said cloud formations further comprises the step of converting said macro representations into convex polytope representations.

8. In an aircraft including a computerized aircraft navigation system, a method of detecting and avoiding cloud formations, the method comprising the steps of:
    acquiring with a camera, consecutively and in real time, a plurality of images within a field of view of the camera;

providing said plurality of images to a central processing unit integrated with said camera, said central processing unit running a software application which is operative for receiving said plurality of images, detecting a plurality of feature points of cloud formations in each of said plurality of images, tracking said plurality of feature points across said plurality of images to create a plurality of 2-dimensional feature tracks, estimating 3-dimensional positions of said feature points in said 2-dimensional feature tracks to obtain estimated 3-dimensional feature tracks, generating macro representations of cloud formations based on said 3-dimensional feature tracks, wherein said step of generating said macro representations includes clustering said 3-dimensional feature tracks into cloud clusters, and wherein said step of clustering includes determining within said images pixels belonging to cloud formations and pixels belonging to background, measuring a distance between selected pixels using a distance function in 3-dimensional space, adding a prohibitive distance to said measured distance if said pixels are on different cloud formations, and setting a predetermined distance threshold for clustering whereby pixels on different cloud formations are not clustered; and determining if said generated macro representations of said cloud formations are within a pre-determined distance threshold;

comparing a future trajectory of said aircraft with said macro representations of said cloud formations to detect relative position, recalculating, if needed, said future trajectory to avoid said generated macro representations of said cloud formations, and communicating said recalculated future trajectory to an autonomous aircraft navigation unit integrated with said camera and said central processing unit; and causing said aircraft to be autonomously navigated based on said recalculated future trajectory.

9. The method of claim 8 wherein each 2-dimensional feature track is treated independently.

10. The method of claim 9 wherein said step of estimating 3-dimensional positions is based on said 2-dimensional tracks and aircraft system current position data for each image.

11. The method of claim 10 wherein said step of estimating 3-dimensional positions is accomplished by a parametric incremental least squares approach.

12. The method of claim 11 wherein said step of estimating 3-dimensional positions includes estimating uncertainties in said 3-dimensional positions.

13. The method of claim 8 wherein said step of generating macro representations of said cloud formations further comprises the step of converting said macro representations into convex polytope representations.

14. The method of claim 12 wherein said step of generating macro representations of said cloud formations further comprises the step of converting said macro representations into convex polytope representations.

\* \* \* \* \*